Jan. 20, 1931.    L. L. GRAHAM ET AL    1,789,650
APPARATUS FOR TESTING AUTOMOBILE BRAKES
Filed Aug. 18, 1923    3 Sheets-Sheet 1

Inventor:
Leon L. Graham
Oscar S. Flood
By: Munday, Clarke & Carpenter
Attys.

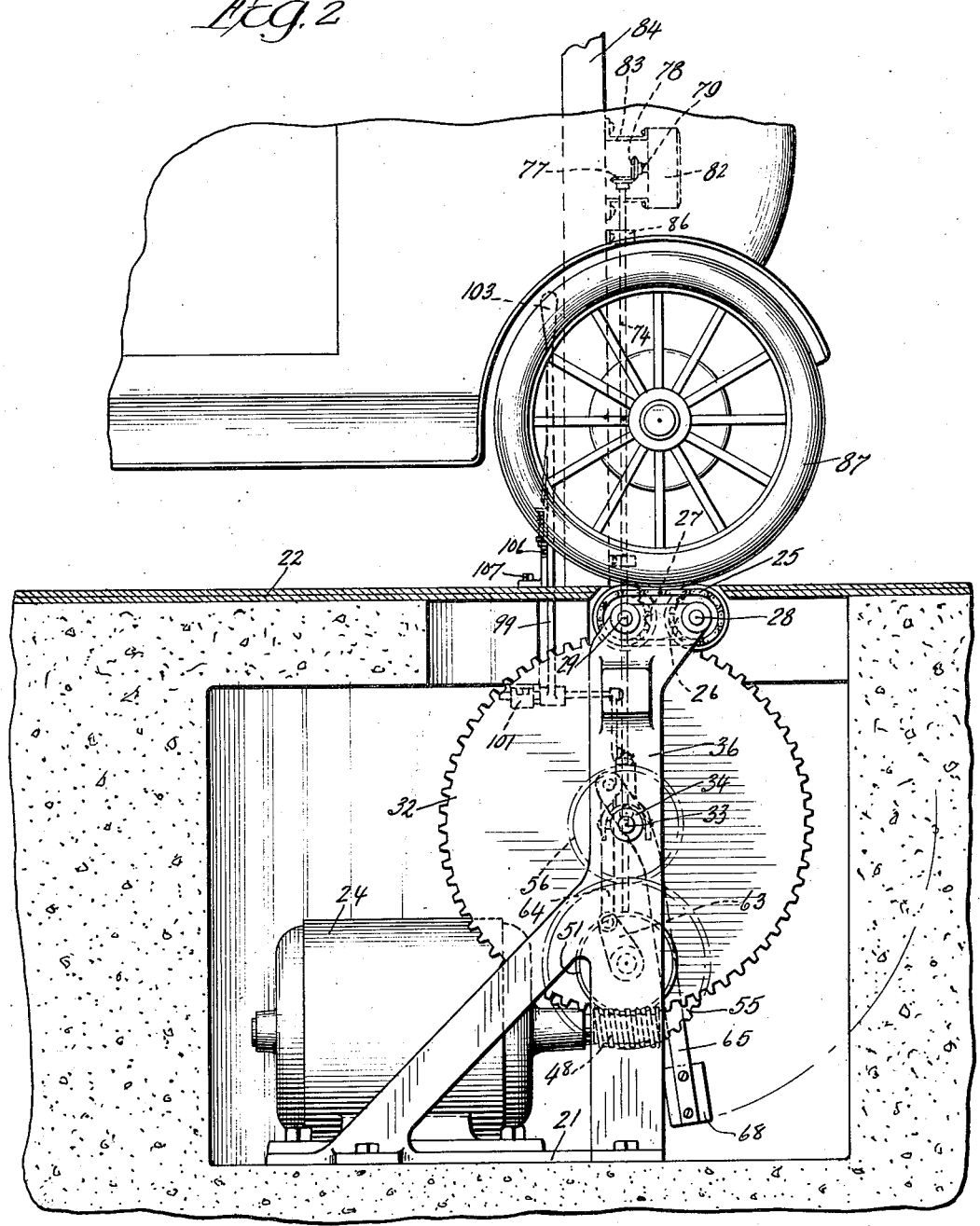

Jan. 20, 1931.    L. L. GRAHAM ET AL    1,789,650
APPARATUS FOR TESTING AUTOMOBILE BRAKES
Filed Aug. 18, 1923    3 Sheets-Sheet 3
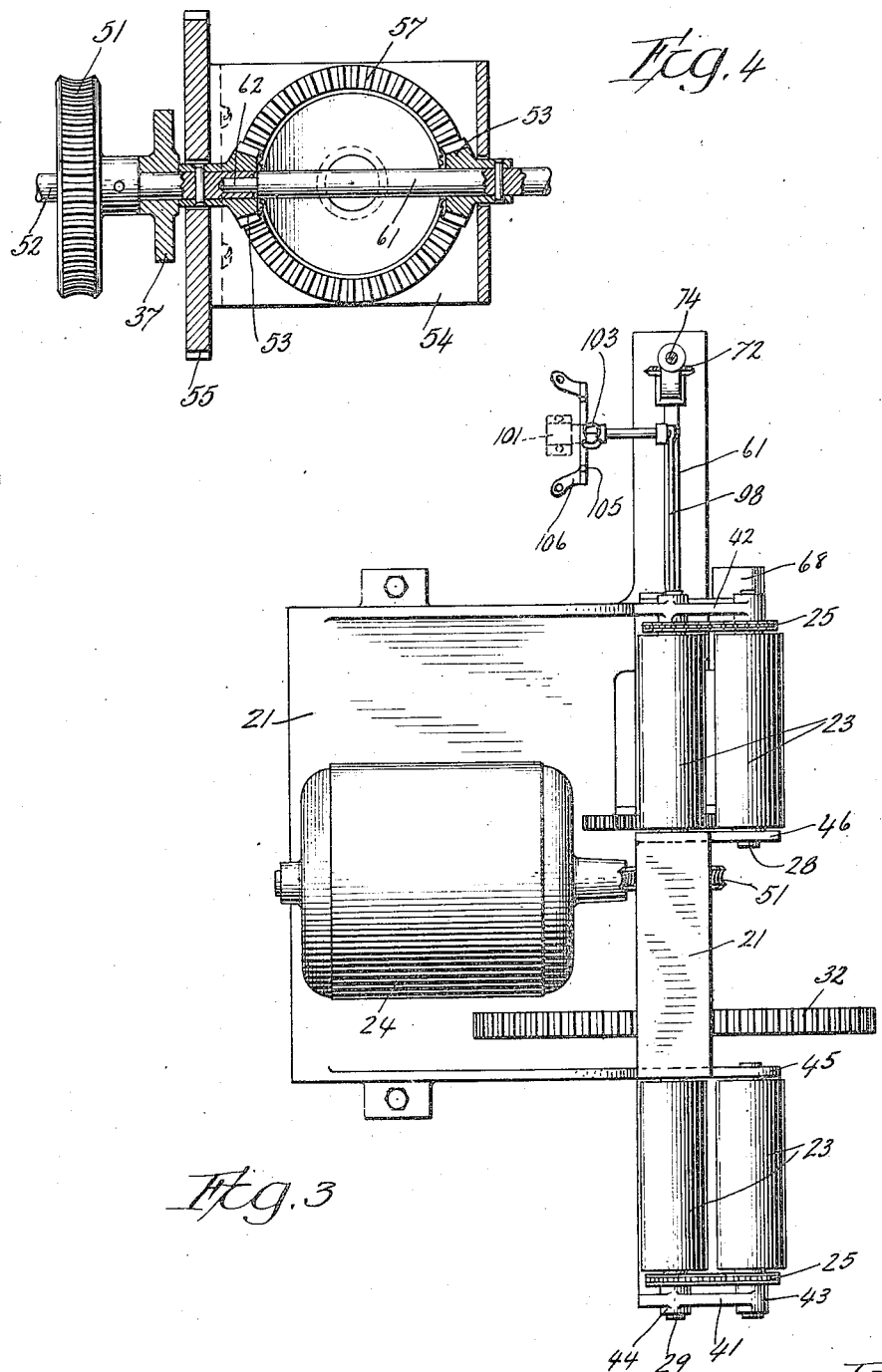

UNITED STATES PATENT OFFICE

LEON L. GRAHAM AND OSCAR S. FLOOD, OF CHICAGO, ILLINOIS, ASSIGNORS TO BENDIX-COWDREY BRAKE TESTER, INC., OF SOUTH BEND, INDIANA, A CORPORATION OF DELAWARE

APPARATUS FOR TESTING AUTOMOBILE BRAKES

Application filed August 18, 1923. Serial No. 658,001.

Our invention relates to apparatus for testing brakes, being particularly adapted for testing the brakes of automobiles.

A principal object of the invention is the provision of apparatus for measuring brake resistance at a factory, garage, or service station, and without the necessity of the road tests now commonly employed for this purpose.

A further object of the invention is the provision of apparatus of this character in which the brake resistance of one or more wheels may be tested as desired and through the manipulation of simple and easily operable controls.

Another important object of the invention is the provision of brake testing apparatus requiring the use of relatively few parts and being adapted to be installed in the comparatively small space usually available at a garage, or service station.

A further object of the invention is the provision of apparatus for the purpose stated which may be installed almost entirely under ground, or under the surface of the floor of the building in which it is employed.

Numerous other objects and advantages of the invention will be apparent as it is better understood from the following description, which, taken in connection with the accompanying drawing, discloses a preferred embodiment thereof.

Referring to the drawings,

Fig. 2 is a side elevation thereof;

Fig. 3 is a plan view; and

Fig. 4 is a sectional view upon a somewhat larger scale, showing the differential gearing and gear housing employed in the operation of the apparatus.

Figure 1:
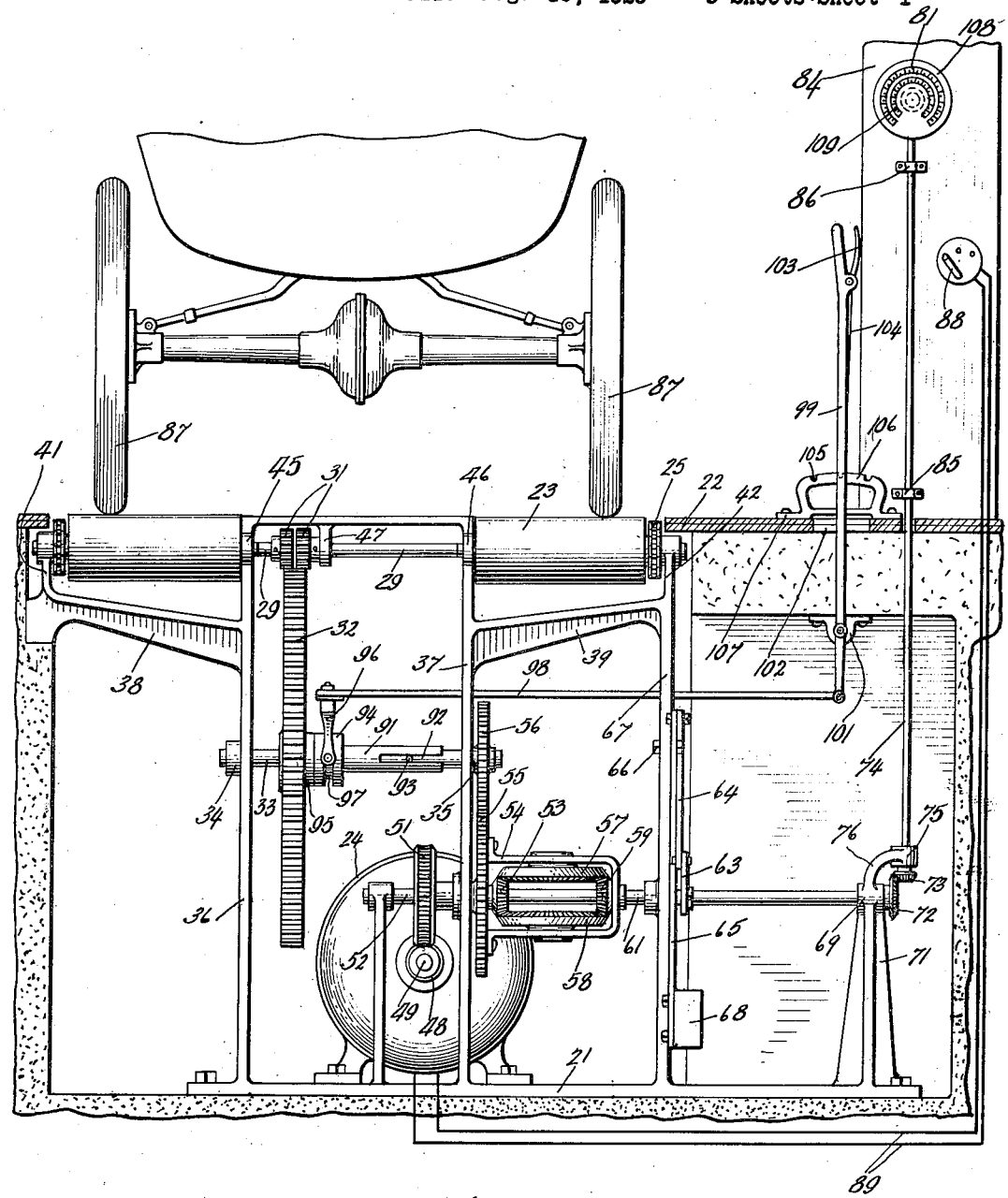
Figure 1 is a rear elevational view of the apparatus, the same being shown installed and with an automobile in position for testing.

While the embodiment of the invention shown in the drawings is believed to be suitable for ordinary conditions, it is, of course, obvious that the practical employment of the invention may necessitate considerable variance in arrangement and method of installation, in accordance with conditions at the particular factory or station in which it is used. For the purpose of illustration, I have shown on the drawings a sub-structure 21 arranged beneath the floor 22 and supporting the operating mechanism which will be hereinafter described.

Wheel rotating drums 23 are arranged in pairs at substantially the level of the floor 22 and are adapted to be rotated by means of a motor 24 operatively connected therewith, as shown particularly in Fig. 1. The drums of each pair are connected together by means of a chain 25 taking over sprockets 26 and 27 mounted respectively on the drum shafts 28 and 29, the latter being driven by means of gearing to be now described. It is to be noted that a separate driving shaft 29 is provided for each pair of drums and these shafts may be driven separately or in unison, to test each wheel separately, or both together, as desired. Pinions 31 are provided, one upon each shaft 29 and in adjacent position so that they may be driven either together or separately by means of a relatively wide ring gear 32, which is slidably mounted upon a shaft 33 having bearings 34 and 35 in uprights 36 and 37 of the framework 21. Said uprights are provided with laterally extending brackets 38 and 39, having upward extensions 41 and 42 which provide bearings 43 and 44 for the shafts 28 and 29. The opposite ends of said shafts are rotatably supported in the uprights 36 and 37, as indicated at 45 and 46, and a depending bearing 47 is provided between said uprights to support the end of the shaft 29, shown at the right in Fig. 1, it being noted that this shaft is considerably longer than the corresponding shaft at the opposite side.

The gear 32 is driven from the motor 24 by means of a worm 48 on the motor shaft 49, said worm meshing with a worm gear 51 on a short transverse shaft 52, carrying, at its opposite end, a bevel pinion 53 which is the driver of a differential mechanism housed in a gear box 54 upon one end of which is formed a spur gear 55, meshing with a gear 56 upon the shaft 33.

The differential mechanism referred to comprises idle bevel gears 57 and 58, which are driven by the pinion 53, a second pinion 59 being mounted at the opposite side of said gear box upon a shaft 61 and meshing with said gears 57 and 58. It will be understood that the pinions 53 and 59 form the opposite sides of the differential, the shaft 61 being, of course, separate from the shaft 52, as will be readily apparent upon inspection of Fig. 4. Said shaft 61 is provided at its inner end with a pin 62 riding freely within the end of the shaft 52, thus strengthening the structure and, at the same time, providing the usual divided relationship of the parts of the differential shaft.

Upon the shaft 61, I provide an arm 63 which is connected by a link 64 with the end of the weight lever 65, which latter is pivoted at 66 to an upright 67 of the frame 21, and carries at its free end a weight 68 which serves to normally hold said shaft 61 in fixed position. The outer end of the shaft 61 is bearinged at 69 in an upright 71 of the frame 21 and carries, beyond said bearing, a bevel gear 72 which meshes with a smaller bevel gear 73 upon a vertical shaft 74 having a bearing 75 in an arm 76 projected upwardly from the upright 71. Said shaft 74 extends upwardly through the floor 22 and carries, at its upper end, a bevel gear 77 meshing with a gear 78 upon a short shaft 79, which serves to drive indicating mechanism, shown generally at 81, in an indicator housing 82. Said housing 82 is secured by means of brackets 83 to a post, or upright, 84 extending upwardly from the floor 22. It will be observed also that the shaft 74 has bearings 85 and 86 upon the upright 84, which latter is positioned slightly to one side of the wheel rotating drums 23 and in convenient position for the reading of the indicating dial 81.

The method of operation of the indicator, it is believed, will be apparent from the foregoing description. The shaft 61 is ordinarily fixed by means of the weight 68, and rotation of the gears 57 and 58 will, therefore, cause rotation of the gear housing 54 by reason of the fact that there is less resistance to this movement than to rotation of the pinion 59, which would result if the shaft 61 were free. Rotation of the housing 54 drives the shaft 33 through the medium of the gears 55 and 56 and this, in turn, operates the shafts 29 through the medium of the gear 32 and the pinions 31. So long as there is no resistance upon the drums 23, they are thus driven freely and there is no effect whatever upon the shaft 61.

For the purpose of testing the brakes of an automobile, the latter may be driven into position with the wheels 87 upon the drums 23 and the motor turned on by means of a switch 88 positioned upon the upright 84 and connected by wiring 89 with said motor. So long as said wheels are free to rotate the drums are not retarded and there is still no effect upon the shaft 61. Upon application of the brakes, however, it will be obvious that rotation of the drums 23 is resisted, there being such frictional engagement between the latter and the wheels as to cause them to rotate in unison. The resistance thus created tends to retard the rotation of the housing 54 and the pinion 59 is thus rotated proportionately to said resistance. In other words, in accordance with the principle of a differential mechanism, there is a tendency to equalize the resistance at opposite sides and to the extent that the drums 23 provide resistance overcoming that of the weight 68, the shaft 61 is rotated and in turn operates the dial indicator 81.

In order to test the brakes separately, we provide means for shifting the gear 32 upon the shaft 33, in order that it may mesh with either or both of the pinions 31. A sleeve 91 is positioned on the shaft 33 and is slotted, as indicated at 92, a pin 93 being provided upon the shaft 33 to take into said slot 92. A collar 94 is secured to the sleeve 91 and to a hub 95 of the gear 32. A bifurcated arm 96 has its opposite ends disposed in a slot 97 upon said collar 94 and is connected by means of a rod 98 with a lever 99 pivotally secured to a frame bracket 101 and extending upwardly through a slot 102 in the floor. A spring grip 103 is provided upon said lever 99 and operates a latching rod 104 adapted to engage at its lower end in recesses 105 in a latching bracket 106 secured to the floor by means of bolts 107, or in any preferred manner. The indicator 81 is provided with separate dials 108 and 109, one being adapted to indicate the resistance when both wheels are being rotated and the other being on a smaller scale and adapted to register the resistance when one wheel only is under test.

From the foregoing, it will be apparent that the only mechanism above ground is the bracket 84, upon which the indicator 81 and the switch 88 are mounted, and the shifting lever 99.

The apparatus provides an extremely practicable means of testing the brake resistance, not only of automobiles, but of other rotating members and is believed to provide a much needed improvement in the field to which the invention relates.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

We claim:

1. An apparatus for testing brakes of automobiles or the like, comprising means for rotating a wheel with which the brake to be tested is associated, a source of power for operating said last-mentioned means, and mechanical means for measuring the resistance to such rotation as the brake is applied to said wheel.

2. An apparatus for testing brakes of automobiles or the like, comprising means for supporting and rotating a wheel with which the brake to be tested is associated, a source of power for operating said last-mentioned means, and mechanical means operable by retardation of said wheel rotating means through application of the brake to the wheel for indicating the extent of brake resistance.

3. An apparatus for testing brakes of automobiles or the like, comprising means for rotating a wheel with which the brake to be tested is associated, a source of power for operating said last-mentioned means, and means for measuring the resistance as the brake is applied to said wheel, said last-mentioned means comprising an indicator and means including a differential for transmitting the brake resistance to said indicator.

4. An apparatus for testing brakes of automobiles or the like, comprising wheel rotating means, a source of power for operating said last-mentioned means, and means operable by resistance upon said first named means for registering the amount of said resistance.

5. An apparatus for testing brakes of automobiles or the like, comprising wheel rotating means, mechanism for operating said means, a differential associated with said mechanism for taking up resistance offered by braking action upon said wheel, and means operable through said differential to indicate the extent of said resistance.

6. An apparatus for testing brakes of automobiles or the like, comprising wheel rotating drums arranged in pairs, each pair being adapted to rotate one wheel of the automobile, a source of power for driving the drums, means operable by application of brakes to said wheel for measuring the amount of brake resistance, and means for selectively connecting said measuring means with said pairs of drums to cause the same to measure the brake resistance of one wheel or the other, or both together.

7. An apparatus for testing brakes of automobiles or the like, comprising means rotatable with a wheel of the vehicle, differential gearing having operative connection with said means, yielding means associated with an element of said differential and means operable through said differential upon movement of said yielding means for measuring braking action upon said wheel.

8. An apparatus for testing brakes of automobiles or the like, comprising means for rotating a wheel with which the brake to be tested is associated, a source of power for operating said means, power connections between said source and said means, and mechanical means, including a yieldable element in said power connections, for measuring the resistance to such rotation as the brake is applied to said wheel.

9. An apparatus for testing brakes of automobiles or the like comprising means for supporting and rotating a wheel with which the brake to be tested is associated, a source of power for operating said means, power connections between said source and said means, and mechanical means operable by retardation of said wheel rotating means through application of the brake to the wheel for indicating the extent of brake resistance, said indicating means including a yieldable element in said power connections.

10. An apparatus for testing brakes of automobiles or the like comprising wheel rotating means, a source of power for operating said means, power connections between said source and said means, and means operable by resistance upon said first named means for registering the amount of said resistance, said registering means including a yieldable element in said power connections.

11. A testing machine for automobiles comprising in combination two pairs of parallel rollers, the rollers of each pair being in alignment with the corresponding rollers of the other pair and each pair of rollers being adapted to support an automobile wheel and to rotate the same, a source of power, means connecting said source of power, to the rollers for the purpose of rotating the same in the same direction, there being a dynamometer in the driving connection between the source of power and the rollers, and means for detachably connecting either one of the pairs of rollers to the source of power independently of the other.

12. A brake tester for testing the action of the brakes upon the wheels of an automobile, that the brake action upon the wheels may be equalized, comprising, in combination, power driven means and connections therefrom to one of the wheels of an automobile to rotate that wheel through a complete revolution under brake resistance, indicating means for indicating the turning force applied to a wheel to turn it under brake resistance, and means for operating the indicating means in response to variations in the turning force applied to the wheel throughout its complete rotation to turn it under brake resistance.

13. A brake tester for testing the action of the brakes upon the wheels of an automobile, comprising in combination, a motor, a wheel engaging device for turning an automobile wheel, a series of elements for transmitting power from the motor to the wheel engaging device including a yielding connection between two of said elements, and an indicator under the control of the yielding connection and adapted to indicate the turning force applied to the wheel.

14. A brake tester for testing separately the action of the brakes upon the wheels of an automobile that the brake action upon the wheels may be equalized, comprising, in combination, a motor, means operable by the motor for rotating one of the wheels of an automobile continuously through a complete rotation while under brake resistance, said means including yielding means adapted to yield in proportion to the driving force required to turn the wheel against the brake resistance, and indicator means connected to said yielding means and adapted to be actuated thereby to indicate such required force that upon completion of the brake test separately on two or more wheels the action of the brakes on the wheels may be equalized.

15. A brake tester for testing the action of the brakes upon the wheels of an automobile that the brake action upon the wheels may be compared and equalized, comprising, in combination, motor driving means for rotating a wheel of an automobile continuously under brake resistance through a complete revolution that the brake action at all points in the revolution of the wheel may be tested, and force measuring means operable by the wheel turning torque to indicate variations in the turning force exerted upon the wheel throughout the entire rotation of the wheel.

16. A brake tester for testing the brake action on the wheels of an automobile that the brake resistance on opposite wheels may be compared and equalized, comprising in combination, wheel supporting and turning means mounted to support one side wheel of an automobile, another wheel supporting and turning means to support the opposite wheel, means other than the automobile driving mechanism to operate either of the wheel supporting and turning means independently of the other wheel supporting and turning means to turn the wheel resting thereon through a complete rotation while under brake resistance, measuring means for indicating the turning force exerted upon a wheel to turn it under brake resistance, and a connection between the wheel operating means and said measuring means to operate the latter in response to variations in the turning force applied to the wheel.

17. A brake tester for testing the braking action of the brakes upon the wheels at opposite sides of an automobile that the brake action upon the wheels may be compared and equalized, comprising in combination, power operated means other than the automobile motor for imparting a continuous rotative movement to a wheel of an automobile to turn the wheel through a complete rotation under brake resistance, said means including means for measuring the force necessary to turn that wheel throughout a complete rotation while under brake resistance that the brake force on opposite wheels of an automobile may be noted and equalized.

18. A brake tester for testing the action of the brakes on the wheels of an automobile that the brake resistance on opposite wheels may be compared and equalized, comprising in combination, a group of rollers mounted to support and turn one of the wheels of an automobile, another group of rollers mounted to support and turn the opposite wheel of an automobile during the brake testing operation, a motor and connections therefrom for rotating one set of rollers independently of the other set to turn the wheel resting on the rotating set independently of the opposite wheel and through a complete rotation while under brake resistance, measuring means for measuring the force required to turn the wheel being tested, and means for operating the measuring means in response to variations in the turning force applied to the wheel being tested to turn it under brake resistance.

19. A brake tester for testing the action of the brakes upon the wheels of an automobile, comprising in combination, a wheel engaging device adapted to turn an automobile wheel through a complete rotation while under brake resistance, a motor operable independently of the automobile driving mechanism to drive the wheel engaging device, a driving connection between the motor and said device to drive the latter from the former and including parts supported to move relatively to each other in response to variations in the turning force exerted upon the automobile wheel, an indicator for indicating the turning force applied to the automobile wheel being tested, and force-responsive means for operating the indicator in response to the movement of one of said movable parts relatively to the other.

20. A brake tester for testing the action of a brake upon a wheel of an automobile, comprising in combination, a supporting frame, an element rotatably supported by the frame, yielding means, means cooperating therewith for rotating said element with permissive yielding movement in response to variations in the turning force applied to the automobile wheel, means engageable with a wheel of an automobile and rotatable by said element to turn the wheel under brake resistance through a complete revolution, indicating means for indicating the turning force applied to said wheel, and means cooperating with the yielding means to actuate the indicating means in response to variations in the turning torque exerted upon the wheel to rotate it under brake resistance.

21. A brake tester for testing the action of the brakes upon the wheels of an automobile that the brake action upon the wheels at opposite sides of the automobile may be compared and equalized, comprising, in combination, wheel engaging means for rotating a wheel of an automobile continuously through a complete revolution under brake resistance, a motor for driving said means, power transmitting mechanism including a yielding driving connection between the motor and said means, and indicating means operable by the yielding movement of the driving connection to indicate the force exerted upon the automobile wheel to turn it under brake resistance.

22. A brake testing machine for the testing of brakes on the wheels of automobiles, comprising a motor, means including a wheel engaging device for turning a wheel of an automobile, means for transmitting power from the motor to the wheel engaging device, comprising two revoluble shafts and a train of gearing transmitting motion between the shafts and having a yielding portion, and means operable through said gear train to indicate the retarding force applied to said wheel.

23. A brake testing machine for the testing of brakes on the wheels of automobiles, comprising a motor, a pair of rolls, a driving connection between the rolls for turning a wheel of an automobile, means for transmitting power from the motor to the wheel egaging rolls comprising two revoluble shafts and a train of gearing transmitting motion between the shafts and having a yielding section, and means operable through the yielding section of said gear train to indicate the retarding force applied to said wheel.

24. A brake tester for testing the action of the brakes upon the wheels of an automobile, that the brake action upon the wheels may be equalized, comprising, in combination, power driven means and means to selectively connect either one of the opposite wheels of an automobile to the power driven means to rotate that wheel through a complete revolution under brake resistance, means for determining and indicating the turning force applied to that wheel to turn it under brake resistance, and means for operating the indicating means in response to variations in the turning force applied to the wheel throughout its complete rotation to turn it under brake resistance.

25. A brake tester for testing separately the action of the brakes upon the wheels of an automobile that the brake action upon the wheels may be equalized, comprising in combination, a motor, means operable by the motor for selectively rotating one of the wheels of an automobile continuously through a complete revolution while under brake resistance, said means including yielding means adapted to yield in proportion to the driving force required to turn the wheel against the brake resistance, and indicator means connected to said yielding means adapted to be actuated thereby to indicate such required force that upon completion of the brake test separately on two or more wheels the action of the brakes on the wheels may be equalized.

26. A brake tester for testing the braking action of the brakes upon the wheels of an automobile, comprising, in combination, power operated means other than the automobile motor for selectively imparting a rotative movement to either one of the opposite wheels of the automobile, means for measuring the force necessary to turn that wheel throughout a complete revolution while under brake resistance, said last mentioned means comprising an indicator and means including a system of gearing for transmitting the brake resistance to said indicator.

27. A brake testing machine adapted to indicate the retardation effect of a brake on at least one wheel of a vehicle comprising a pair of rotatable drums adapted to drive a vehicle wheel, the brake of which is to be tested, a motor, driven connections from the motor to at least one of the drums, including a shaft, gearing operatively associated with the shaft and at least one of the drums, a driving connection between the motor driven drum and the other of said drums, force measuring means, means to transmit the reactive force resulting from the brake application through the gearing to said force measuring means.

28. Brake testing apparatus comprising, in combination, a source of power, means including a wheel engaging device, mechanical connections from the source of power acting through said device to turn the wheel against the resistance of its brake, said connections including a set of intermeshing gears one of which is normally stationary but which is turned upon an increase of the brake resistance, pendulum means to resist turning of said gear, an indicator and means operated by the turning of said gear to control said indicator, the latter being calibrated to show said increasing resistance.

29. Brake testing apparatus comprising, in combination, a source of power, means including a wheel engaging device, mechanical connections from the source of power acting through said device to turn the wheel against the resistance of its brake, said connections including a yielding means and intermeshing gears, a carrier for at least a part of said gears which can turn angularly, and an indicator to show the brake resistance operated by the torque of one of the gears carried by said carrier and acting on another of the gears carried by the carrier.

30. An apparatus for testing brakes of automobiles or the like comprising, in combination, wheel engaging means for turning a wheel against the resistance of its brake, a source of power for operating the wheel engaging means to cause the engaging means to rotate the wheel, gearing operatively associated with the wheel engaging means, and means connected with a portion of the gearing and movable therewith to measure the amount of brake resistance applied to the vehicle wheel.

31. A brake testing apparatus comprising, in combination, means including a wheel engaging device adapted to impart motion to a vehicle wheel, a source of power, transmission connections from the source of power to the wheel engaging device including a set of intermeshed gears, means movable about a fixed axis, means connecting the movable means to at least one of the gears and movable thereby to measure the braking resistance applied to the wheel.

32. A brake testing apparatus comprising, in combination, means including a wheel engaging device adapted to turn the wheel against the resistance of its brake, a source of power, a motion transmission mechanism between the source of power and the wheel engaging device including a set of intermeshing gears, certain of which gears are capable of relative displacement, and means operable upon relative displacement of one of the gears from its normal position to measure the retarding force applied to the wheel.

33. Brake testing apparatus comprising, in combination, a source of power, wheel engaging means driven by the source of power and adapted to turn a wheel against the resistance of its brake, a motion transmission mechanism connecting the power source and the wheel engaging device including a planetary gear system, means effective upon the application of retarding force to the wheel to relatively displace at least one of the members of the gear system proportionately to the retarding force, and means to measure such displacement.

34. Brake testing apparatus comprising, in combination, a wheel engaging means, a source of power, a motion transmission mechanism between the source of power and the wheel engaging means including a planetary gear system, a measuring means, means to operatively connect at least one of the gears of the system to said measuring means to indicate the retarding force applied to the wheel.

35. Brake testing apparatuss for a vehicle wheel comprising, in combination, wheel engaging means, a source of power, a motion transmission mechanism between the source of power and the engaging means including a balanced planetary gear train, said transmission mechanism being adapted to rotate a vehicle wheel through the said wheel engaging means, means effective upon the application of retarding force to the wheel to displace at least one of the members of said balanced train proportionately to the retarding force, and means connecting said member and movable independently of the driving means to measure such displacement.

36. An apparatus for testing brakes of automobiles and the like comprising, in combination, a pair of parallel rolls adapted to engage and drive a vehicle wheel, driving connections between the rolls, a source of power, means connecting the source of power to the rolls, and measuring means in said connecting means for measuring the turning force applied to the wheel to turn it under brake resistance.

37. An apparatus for testing brakes of automobiles and the like comprising, in combination a pair of rotatable members adapted to frictionally engage a vehicle wheel for turning it against the resistance of its brake, a positive drive between said rotatable members, a source of power and measuring means connected between the source of power and the rolls adapted to measure the turning force applied to the wheel to turn it under brake resistance.

38. A brake testing apparatus comprising, in combination, a source of power and a wheel engaging device, mechanical connections from the source of power acting through said device to turn the wheel against the resistance of its brake, said connections including intermeshed gears, and measuring means to show the brake resistance operated by the torque of said gears acting on each other.

39. In apparatus for testing the brakes of vehicles and the like, the combination with a force measuring means, of means upon which the vehicle is supported, driving means connected with the supporting means to turn the wheel against the resistance of its brake, and a connection actuated by operation of said wheel supported means for reacting on the force measuring means to measure the dynamic braking effect.

40. In apparatus for testing brakes of vehicles and the like, the combination with force measuring means, of a roller means upon which the vehicle wheel is supported and which is mounted for rotation about a fixed axis, driving means to turn the wheel against the resistance of its brake, and means associated with the roller which causes a reaction upon said force measuring means, and so turning the wheel.

41. In apparatus for testing the brakes of vehicles and the like, the combination of means supporting the weight of the vehicle through its wheel, said means being adapted to be driven to rotate the wheel, driving means associated with said supporting means to turn the wheel against the resistance of its brake, with means for measuring the force required to operate said supporting means through one or more complete revolutions.

42. In apparatus for testing the brakes of vehicles and the like, the combination of rollers mounted to turn on fixed axes and supporting the weight of the vehicle through its wheels, driving means associated with the rollers for turning the wheels against the resistance of their brakes while suporting the weight of the vehicle, and means for measuring the forces required to operate said rollers to turn said wheels.

43. In apparatus for testing the brakes of vehicles and the like, the combination of rollers mounted to turn on fixed axes and supporting the weight of the vehicle through its wheels and which are operable while supporting said weight to turn the wheels against the resistance of their brakes, power means for operating said rollers, and force measuring means connected to and reacted on by the power transmitted to the rollers by said power means.

44. In apparatus for testing the brakes of a vehicle whose weight is resting on its wheels, the combination of devices upon which at least two of the wheels rest, said devices being adapted to be driven to rotate the wheels resting thereon and of driving means for operating said devices to turn the wheels against the resistance of their brakes, with force measuring means, said measuring means including a device to connect the measuring means to the driving means, said force measuring means being reacted on and actuated by said operation of said device to turn the wheels.

45. An apparatus for testing the brakes on automotive vehicles comprising means to support a wheel of the vehicle, said supporting means being adapted to be driven to rotate the wheel against the resistance of its brake, including a source of power for operating the wheel rotating means, and means operated by the resistance imposed upon the wheel rotating means for measuring the amount of the brake resistance.

46. An apparatus for testing the brakes on vehicles comprising the combination of means to support the wheels of a vehicle, said means being also adapted to be driven to rotate the wheel against the resistance of its brake, including a source of power for driving said means and a yieldable means operable by the resistance imposed upon the wheel rotating means to measure the amount of the brake resistance.

47. An apparatus for testing the brakes of vehicles comprising means for rotating the wheel of a vehicle against the resistance of its brake including differential gearing, and means operable through the differential gearing for measuring the brake action upon the wheel.

48. An apparatus for testing the brakes of vehicles comprising wheel supporting rollers arranged in pairs, each pair being adapted to rotate one wheel of the vehicle against the resistance of its brake, driving means for the rollers adapted to effect rotation thereof, means operable by the application of the brakes to the wheel for indicating the amount of brake resistance, and means for selectively connecting said indicating means with the rollers to cause the same to indicate the brake resistance of one of the wheels.

49. An apparatus for testing the brakes of automobiles and the like comprising means for rotating a wheel of the vehicle, means operable by the application of the brake of the wheel for measuring the amount of brake resistance, and means for optionally connecting said measuring means with a wheel rotating means to cause the same to measure the brake resistance on one of the wheels when said connecting means is connected to said wheel rotating means.

50. A brake testing machine comprising in combination a shaft rotated at substantially constant speed, wheel engaging means driven by the shaft and operable to turn the wheel of an automobile against the resistance of a brake associated with said wheel, and measuring means operated by the reaction of the brake upon the wheel engaging means without substantially changing the speed of rotation of said shaft.

51. A brake testing apparatus comprising in combination a power driven shaft, wheel engaging means driven by the shaft and operating to turn the wheel of an automobile against the resistance of a brake associated with said wheel, a portion of said wheel engaging means being caused by the reaction of the brake to lag behind the angular position it would have assumed if the brake had not been applied, and measuring means operated by the lagging of the said portion of the wheel engaging means.

52. An apparatus for testing brakes of a vehicle comprising means for rotating a wheel of the vehicle including a system of gearing and a movable member adapted to support at least a portion of the gearing, means yieldably resisting movement of the member, an indicator mechanism, means whereby the mechanism is connected with the member, said connecting means including means operable upon retardation of the wheel to displace said member and actuate the indicator.

53. An apparatus for testing brakes of automobiles and the like comprising a wheel supporting means, said means being adapted to be driven to rotate the wheel, a power-driven shaft, a system of gearing interposed between the shaft and wheel supporting means, a movable but normally stationary support for part of the gearing, means yieldably resisting movement of the support, an indicator, means connecting the indicator with the support, and means included in the connections and operable upon retardation of the wheel to move the support and actuate the indicator.

54. An apparatus for testing brakes of automobiles and the like, comprising a wheel suporting means, said means being adapted to be driven to rotate the wheel, a power-driven shaft, a planetary gear train directly connected to the wheel supporting means and shaft and adapted to actuate the supporting means to move a vehicle wheel, an indicator, and devices connecting the indicator to the gear train and yieldably operable through the gearing to actuate the indicator and indicate the retarding force applied to the wheel.

55. An apparatus for testing brakes on vehicles comprising a wheel supporting means, said means being adapted to be driven to rotate the wheel, a driving means therefor independent of the vehicle, a planetary gear system driven thereby and directly connected to the wheel supporting devices, an indicator, and means yieldably operable through the gearing to actuate the indicator and indicate the retarding force applied to the wheel.

56. An apparatus for testing brakes of vehicles and the like comprising a wheel supporting means, said means being adapted to be driven to rotate the wheel, a driving shaft therefor, an epicyclic gear train driven by the driving shaft and directly connected to the wheel supporting means, a yieldably movable support for a portion of the gear train, means to move the support in accordance with the variations in the retarding force applied to a vehicle wheel, an indicator mechanism connected with the support and adapted to be actuated by the movement of the support.

57. An apparatus for testing brakes of a vehicle comprising a wheel supporting means, said means being adapted to be driven to rotate the wheel, a driving shaft therefor, an epicyclic gear train directly connected to the shaft and wheel supporting means, a yieldable pivotal support for a portion of the gear train, and means to cause the pivotal support to move in accordance with variations in the retarding force applied to a vehicle wheel, an indicator means to connect the indicator to the support, said indicator being adapted to be actuated by said movement.

58. An apparatus for testing the brakes of a vehicle comprising a wheel supporting means therefor, said supporting means being adapted to be driven to rotate the wheel, driving means including a system of gearing operatively connected to said wheel supporting means, movable means including a yieldable means adapted to support at least a portion of the gearing, an indicator and means to operatively connect the indicator with the support means, and means operable upon retardation of the wheel to displace the support means and thereby actuate the indicator.

59. A brake tester for testing the braking action upon the wheel of a vehicle comprising in combination, wheel engaging means, a source of power other than the vehicle motor acting through said wheel engaging means for turning a wheel of the vehicle against the resistance of its brakes, connections between the source of power and the wheel engaging means, means for measuring the force necessary to turn the wheel against such resistance including a system of gearing, and an indicator connected to the gearing operable thereby to indicate the brake resistance.

LEON L. GRAHAM.
OSCAR S. FLOOD.